March 18, 1958  C. R. JOHNSON  2,827,340
BEARING
Filed March 8, 1956

INVENTOR.
Carl R. Johnson
BY
Norman S. Blodgett
Attorney

United States Patent Office 2,827,340
Patented Mar. 18, 1958

2,827,340
BEARING

Carl R. Johnson, Worcester, Mass., assignor to Paramount Oilless Bearing Company, Inc., Worcester, Mass., a corporation of Massachusetts Application March 8, 1956, Serial No. 570,307

1 Claim. (Cl. 308—72)

This invention relates to a bearing and more particularly to a pillow block bearing for retaining a rotating shaft in substantially frictionless engagement.

In the past it has been common practice to make plain bearings in a pillow block form in which the bearing surface is a circular cylinder and the bearing is divided along a plane passing through the axis of the cylinder. A film of oil is provided between the cylindrical surface and the surface of a shaft held in the bearing. Although this type of bearing has many advantages, not the least of which is the fact that it is rugged and inexpensive, it is not capable of compensating for misalignment in the shaft. If the shaft axis is not parallel to the cylinder axis, the oil film may no longer exist between the bearing and shaft and the bearing may fail. These and other difficulties experienced with previously-known pillow block bearings are obviated in a novel manner by the present invention.

It is, therefore, an outstanding object of the invention to provide a self-aligning pillow block bearing. A further object of the present invention is the provision of a pillow block bearing which is self-compensating for shaft misalignment and which is inexpensive and rugged in construction.

With these and other objects in view, as will be apparent to those skilled in the art, the invention resides in the combination of parts set forth in the specification and covered by the claim appended hereto.

The character of the invention, however, may be best understood by reference to certain of its structural forms, as illustrated by the accompanying drawings in which.

Figure 1:
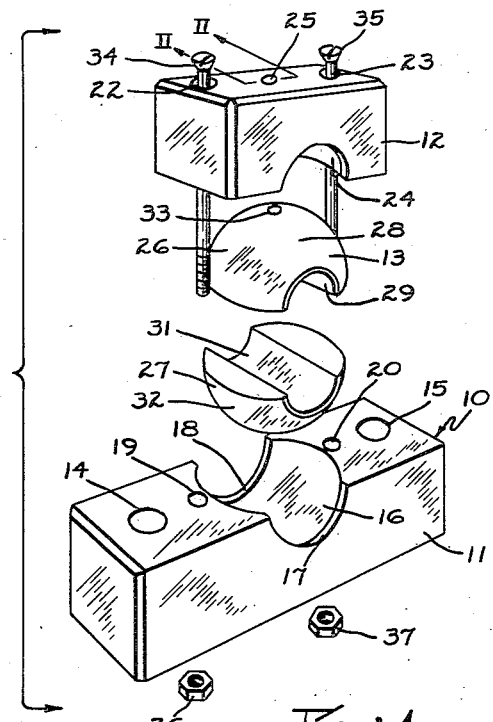
Figure 1 is an exploded isometric view of the invention.

Referring first to Figure 1, wherein is best shown the general features of the invention, the bearing, indicated generally by the reference numeral 10, is shown as comprising a base 11, a cap 12, and a split ball 13. All of these parts are made from a wood, such as lignum vitae, which has been impregnated with oil by a special process, which process forms no part of the present invention. The base 11 is in the form of a rectangular parallelepiped which has vertical bolt holes 14 and 15 at opposite ends whereby it may be fastened to a supporting member. At its center the base is formed with an upwardly-facing hemispherical recess 16, the diameter of the defining sphere being considerably larger than the width of the base. This means that the surface of the recess intersects the front and back vertical surfaces of the base to form semicircular edges 17 and 18, respectively; these edges are provided with a generous bevel. On the opposite sides of the recess 16 are situated vertical bolt holes 19 and 20.

The cap 12 of the bearing has the same width and thickness as the base, but is somewhat shorter than the base. It is also in the form of a rectangular parallelepiped. At its opposite ends it is provided with vertical bolt holes 22 and 23 which are spaced the same distance apart as the bolt holes 19 and 20 in the base. At its center the cap is formed with a downwardly-directed hemispherical recess 24 whose defining sphere is exactly the same size as that of the recess in the base; the semi-circular intersections of the surface of the recess with the front and back surfaces of the cap are similarly provided with generous bevels. Vertically mounted in the center of the cap is a pin 25 of cylindrical form which extends into the recess a considerable distance.

Figure 2:
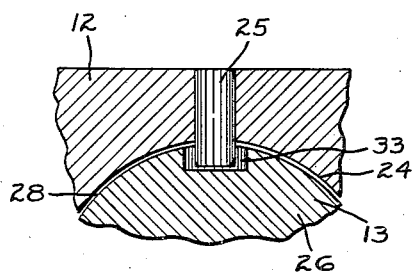
Figure 2 is a section view of the invention taken on the line II—II of Figure 1.

The ball 13 consists of an upper half 26 and a lower half 27. The upper half is formed with a hemispherical convex surface 28, defined by a sphere of a slightly smaller diameter than the sphere which defines the recess 24. A bore 29 is formed on the underside and mates with a bore 31 in the lower half 27 to form a circular cylindrical surface extending through the ball. The lower half 27 is also provided with a hemispherical convex surface 32; when the two halves are placed together with their diametrical parting surfaces together, the resulting sphere is of a slightly smaller diameter than the defining sphere of the recesses 16 and 24. The halves are limited in the dimension parallel to the bores to an amount as wide as the base and cap; thus the edges formed by the intersections of the bores and the hemispherical surfaces are semicircular and are provided with generous bevels. The upper central portion of the upper half is provided with a shallow bore 33, as is evident in Figure 2. The bore 33 extends into the upper half a distance approximately the same as the distance that the pin 25 extends into the recess 24, but has a considerably larger diameter than the pin. Flat-head bolts 34 and 35 are provided to pass through the bolt holes 19 and 22, on the one hand, and 20 and 23 on the other hand, respectively, and to have nuts 36 and 37 threaded on them.

The assembly of the bearing with the shaft and the operation will be readily understood in view of the above description. The lower half 27 of the ball 13 is placed in the recess 16 and the shaft to be retained is laid in the bore 31. After that, the upper half 26 of the ball is lowered in place with the bore 29 embracing the upper half of the shaft. The bores 29 and 31 are made of such a diameter as to surround closely the shaft in the manner customary with plain bearings. The cap 12 is then lowered into position on the said upper half, with the pin 25 situated in the bore 33 and the bolt holes 22 and 23 aligned with the bolt holes 19 and 20 respectively. The bolts 34 and 35 are placed in operative position in their respective bolt holes and the nuts 36 and 37 are threaded in place. The parts are pressed into snug operative condition surrounding the shaft and, then, the base 11 is bolted in place on a support by using the bolt holes 14 and 15.

If and when the shaft moves out of the initial alignment for which the bearing is set, the ball 13 is moved out of alignment at the same time because it is, in effect, mounted on the shaft. Any great deviation of the ball from the original positioning will be prevented by the engagement of the pin 25 with the surface of the bore 33. Misalignment is possible in both vertical and horizontal planes, but in any case is limited in the manner described.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

A pillow block formed of oil-impregnated hardwood, comprising a base having the form of a rectangular parallelepiped, a cap also having the form of a rectangular parallelepiped of considerably shorter length than the base, means for fastening the cap to the central portion of the base, the base being provided with attaching apertures in portions thereof extending beyond the said cap, a ball, the ball being of spherical form and having a first circular cylindrical bore therethrough adapted to embrace and retain a shaft, the ball being split into two halves by a plane passing through the axis of the said first bore, the base and cap being formed with hemispherical recesses which cooperate to enclose the ball, the spheres which define the ball and the recesses having diameters considerably larger than the dimensions of the base and cap in their central portions in the direction of the shaft, and a pin mounted in the cap and extending into the recess therein at the portion thereof furthest removed from the edges of the recess, a second bore extending into one half of the ball a distance approximately the same as the distance that the said pin of circular cross-section extends into the recess in the cap, the second bore being located at a portion of the said half that is furthest removed from the edge formed by the split, the second bore having a diameter considerably larger than that of the pin, the pin residing in the said second bore whereby movement of the ball within the cap and base in all planes is limited.

References Cited in the file of this patent

UNITED STATES PATENTS

| | | |
|---|---|---|
| 440,814 | Lieb | Nov. 18, 1890 |
| 489,505 | Silvey | Jan. 10, 1893 |
| 650,852 | Metzger | June 5, 1900 |
| 819,982 | Croasdale | May 8, 1906 |

FOREIGN PATENTS

| | | |
|---|---|---|
| 673,763 | Great Britain | June 11, 1952 |
| 679,670 | Great Britain | Sept. 24, 1952 |